May 1, 1928.　　　　　　　　　　1,667,769
J. G. CALLAN
LIQUID LEVEL INDICATOR
Filed March 25, 1922
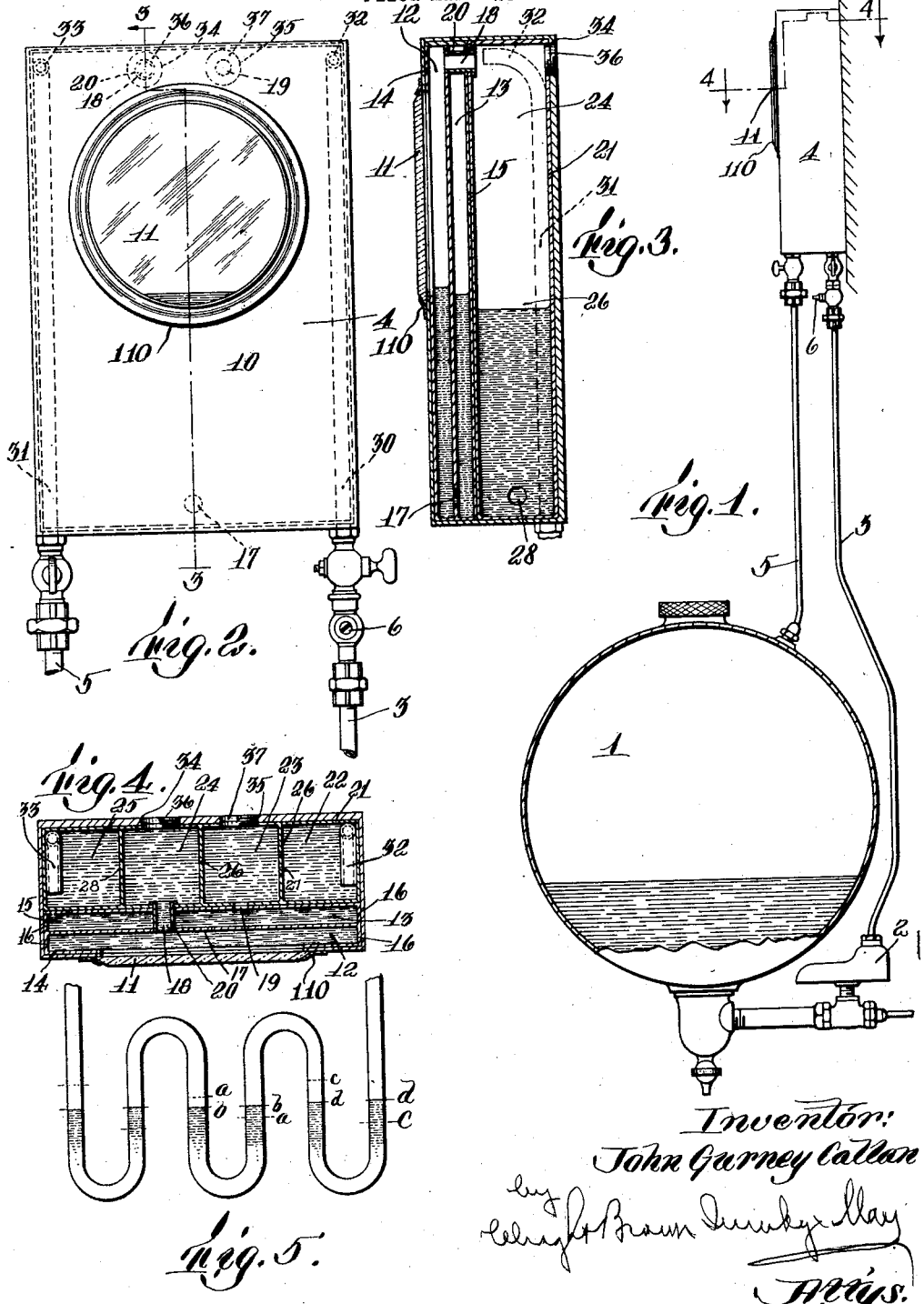
Inventor:
John Gurney Callan Patented May 1, 1928.

1,667,769

UNITED STATES PATENT OFFICE.

JOHN GURNEY CALLAN, OF CAMBRIDGE, MASSACHUSETTS.

LIQUID-LEVEL INDICATOR.

Application filed March 25, 1922. Serial No. 546,561.

This invention relates to liquid level indicators having been designed more particularly for use on automobiles for the purpose of showing at the dash the level of liquid fuel in the supply tank and is designed to accomplish this result whether the fuel tank is adjacent, or remote, or whether or not it carries air pressure in excess of atmospheric.

This invention is also suitable for other uses where the height of fluid or a pressure of a comparatively small amount is to be read. The underlying principle of this invention is closely analogous to that of Hero's fountain and for a more complete understanding of its application reference may be had to the accompanying drawings in which Figure 1 is a side elevation of the indicator as connected to the fuel reservoir of an automobile.

Figure 2 is a front elevation of the indicator.

Figure 3 is a section on line 3—3 of Figure 2.

Figure 4 is a section on line 4—4 of Figure 1.

Figure 5 is an elevation of a multiple U tube illustrating the principle of this invention.

Referring to Figure 1 the fuel tank is indicated at 1 and has communicating therewith below the level of the liquid therein a closed chamber 2. At its upper end this chamber communicates through a pipe 3 with the pressure indicator 4. The closed chamber 2 is nearly filled initially with air and preferably located about the level of the bottom of the fuel supply tank 1. For reasons that will be apparent later it is better that this chamber be not very tall vertically, the proportions relative to the fuel tank shown in the drawing being suitable. The indicator 4 is designed to show the pressure of air in the chamber 2 with which it is connected, the specific form of this indicator being described later. If the tank 1 carried air pressure in excess of atmospheric it is connected with the indicator by a second tube 5 which opens into the tank above the liquid level and to the indicator in a manner later described. The action of these elements in general terms is as follows.

When the fuel tank is nearly empty there is correspondingly little hydrostatic pressure on the fuel and hence on that in the closed chamber 2 and on the air in that chamber, this low pressure being communicated to the indicator and there registered. On the other hand, when the tank contains a larger amount of fuel the added hydrostatic head due to this added fuel communicated to the air in the closed chamber, and thence in turn to the indicator, causes this to register this higher pressure in a manner that directly informs the operator where the fuel level stands in the tank.

The simplest form of instrument for indicating this pressure would evidently be a U-shaped tube partially filled with a liquid, but unless mercury were to be used the pressure range to be measured would necessitate an instrument ten or twelve inches high which would not be suitable for use on the dash of a self-propelled vehicle. If mercury were used, changes in level, due to irregularities in the road, would be liable to vitiate the readings. Various forms of pressure gage based on mechanical devices such as Bourdon tubes, diaphragms, and the like, become either disproportionately expensive or unreliable when the pressure range goes no higher than a few ounces per square inch as in this case. Therefore it becomes necessary to devise an indicator of acceptable cost and attractive size for these ranges of pressure, if this principle is to be used, and for this purpose the indicator shown more specifically in Figures 2 to 4 has been devised.

Figure 5 illustrates a plurality of U tubes in series each partially filled with water, the inverted U's connecting the branches of the adjacent U tubes being filled with air. With this arrangement if a certain total pressure be applied at one end of the series, then for any one U tube the diplacement of liquid level is only a fraction of that corresponding to the total pressure applied, this fraction being determined by the number of U tubes in the series and their respective internal dimensions and being for small pressures and U tubes of identical internal dimensions substantially of $\frac{1}{N}$ of the displacement corresponding to the total pressure where N denotes the number of erect U tubes. By the use of U tubes of different internal dimensions, that is, of different cross sectional area, the relative displacement of the columns in the several U tubes may be controlled as will be explained later. If this series of U tubes is substituted for a single U tube as an indicator of the hydrostatic pressure and the indication of the final tube observed, the instrument could thereby be shortened to unobjectionable height, but there would be a large temperature error due to the change of volume of air in the inverted U's with temperature change. This error would throw out the indication by a large fraction of its whole amount on account of the mean change of temperature between winter and summer.

This temperature error, however, may be overcome by reading the indication from the middle one of a series whereof the number of erect U tubes is odd so that the number on each side of the middle tube shall be the same. Here the effect of expansion of air in the inverted portions tends to raise the level of the outer ends of both end columns, but the reaction on the two ends of the middle column balances so that there is no effect thereupon. This balancing effect on the columns of liquid in the tubes will hold good whether the external pressures acting on the open ends of the system of tubes are equal or unequal. Thus, so far as expansion of air in the inverted U's is concerned, there is no error due to temperature variation. At first sight it might appear that expansion of air in the tube 3 leading from the closed chamber to the indicator, should cause a temperature error, but since the pressure of air in this tube, as in the closed chamber, directly measures under all conditions the hydrostatic head of fuel in the tank above the level of fuel in the closed chamber, and since head of fuel is the quantity which it is desired to measure, the only correction due to temperature change and consequent volume change of air in the tube 3 and the closed chamber itself will be that due to change of fuel level in the chamber 2. As this chamber is made of small vertical height relative to its horizontal cross section and the tube 3 is small this correction may be reduced to a very small factor negligible for all practical purposes small changes in level therein being caused by relatively large volume changes above the liquid therein and in the pipe 3 corresponding to large temperature and pressure changes. It is possible to achieve the temperature compensation with an even number of U tubes of non-symmetrical design, as for example, with a series where the tubes connected to one side of the reading tube are of larger bore than those connected to the other, so long as the condition is fulfilled that the proportion of the total impressed head balanced by the U tubes on one side of the reading tube shall be the same as that balanced by those on the other. This fact may be taken advantage of as will be described later in calibrating the indicator for various sizes of tank.

If the indicator, the closed chamber, the tube, and the connections are all perfectly tight, the air initially put into the chamber will serve for several months without attention. For initially filling the chamber 2 and to provide means for refilling it if the air be lost in whole or in part through leakage or any other cause, the air connection shown at 6 is provided. Air introduced through this connection first displaces any fuel that may lie in the bottom of the closed chamber and then any excess passes into the main fuel tank, bubbles up through the fuel therein, and is discharged. The introduction of this air momentarily raises the level of the indicator and care must be taken not to pump or blow it in violently and thereby cause the indicator to overflow. A minimum amount of air to fill the closed chamber will be required when the fuel level of the main tank is at a minimum and the temperature is at its highest working range and air will spill out from time to time through the main fuel tank until this condition has once been reached after which, barring accident, the air supply remains substantially constant for several months. To replace air which may be gradually dissolved in the gasoline in the chamber 2 over long periods, all that will be necessary will be to blow into the connection 6 occasionally, say once a season, until bubbles escape into the tank.

The particular form of indicator is of importance since it is evident that the elementary form of multiple U-tube disclosed in Figure 5 is not well adapted for the purpose. Referring, therefore, to Figures 2 to 4 the indicator comprises an external casing carrying above its middle portion in its front wall 10 a transparent window 11 through which the level of indicating fluid is read. This window is preferably of the same shape as a cross section of the fuel tank in the vehicle for which it is intended and may be secured in place as by a retaining ring 110. Consequently the level of the liquid may be seen as it appears in the tank. Immediately back of this window and the front face of the casing are two wide relatively thin flat chambers 12 and 13 formed by partitions 14 and 15 extending laterally of the casing and from top to bottom. These partitions may also be connected by end walls 16 so that the two chambers together may be a complete unit. At their lower ends these chambers are connected by means of a port 17 so as to form a U tube and each chamber has an opening or port at its top at 18 and 19 opening backwardly, the opening 18 communicating through a pipe 20 extending through the rear chamber 13 and opening 19 extending through the rear partition 15, these ports being positioned one on either side of the center of width of the chambers.

The front branch or leg of this U tube is visible at its upper portion through the window 11 and is the branch from which the readings of liquid level are to be taken. This U tube, therefore, is the central U tube of the series. The U tubes at either side of this tube are formed back of the partition 15 and comprise a casing 21 divided into chambers 22, 23, 24, and 25 by vertical partitions 26. The chambers 21 and 23 are connected at their lower ends through a partition 26 by means of a port 27 and the chambers 24 and 25 are similarly connected by a port 28, this construction forming a pair of U tubes, though it is evident that more partitions could be employed to divide this space into any number of U tubes desired.

The upper end of the chamber 24 communicates through the port 18 and tube 20 to the upper portion of the chamber 12 while the upper portion of the chamber 23 communicates through the port 19 with the upper portion of chamber 13. This construction therefore forms a series of three U tubes, one branch or leg of the central U tube being positioned immediately back of the window 11. It will be noted that the U tubes on either side of the central tube are symmetrical. While the same number of U tubes have been shown on either side a non-symmetrical arrangement might be designed as above noted, but this, however, would be needlessly complicated. Lack of symmetry on the two sides would be used only if an external temperature error were to be compensated for or if an indication involving sensibility to temperature were desired, neither of which conditions are found in the specific application thus far described.

It will be noted that, as shown, the inner leg of the flanking U tubes, that is, the one nearest the median line of the instrument is connected near its top to the appropriate leg of the flat central U tube. The top of the outer leg of each is connected through pipes 30 and 31 to the pipes 3 and 5, respectively. These pipes preferably lead down through the chambers 21 and 25, this being the most convenient place for attachment to the tubes 3 and 5 and their upper ends are preferably turned toward the front of the instrument as shown at 32 and 33 in Figures 3 and 4 and open shortly back of the partition 15, this construction being for a purpose which will be described.

In Figure 1 the pipes 3 and 5 are shown in different planes from front to back of the instrument, this being merely for the sake of a clear showing of these parts, it being usually more convenient for the pipes to be positioned in the same front to back plane. If the fuel in the tank is at atmospheric pressure the pipe 5 may be omitted, allowing the pipe 31 to open directly to the atmosphere.

The sizes of the flanking U tubes composed of the chambers 22, 23, 24, and 25, relative to the indicating tube composed of the chambers 12 and 13, is an important element in determining the law of the particular apparatus, as may be seen by reference to Figure 5, in which a series of U tubes are shown, the central one being of greater cross section than those on either side. In this case when a pressure applied at the right hand end displaces the columns, the displacements in the center and end tubes are unequal, that in the larger central tube $a$—$b$ being less than in the end tubes at $c$—$d$. This is evident from the fact that by movement of the liquid, the air in the first inverted U shaped tube is displaced from a bore of less to one of greater capacity per linear inch and therefore occupies fewer linear inches than before and thus displaces the second liquid column by a smaller amount than the first is displaced. If the pressure is applied in reverse direction, the reverse effect takes place, the column in the tube of smaller area being displaced to a greater extent than in the larger. This principle affords a means of using a standard form of case and height of window and thus adjusting the travel of the visible indicating column of the indicating fluid in the chamber 12 to conform to the height of fuel in the tank so that it may just traverse the height of the window for the change from full to empty of tanks of various sizes. This adjustment is effected by changing the relation between the cross section of the flat indicating tube comprising the chambers 12 and 13 and the other tubes comprising the chambers 22, 23, 24, and 25 attached in series to its ends. In this case it is better from a manufacturing point of view to leave the flat indicating U tube unchanged and to change the rectangular section of tubes behind it by making them as receptacles deeper or shallower from front to back to meet the requirements of cars having different sizes of tank. For this reason the tubes 12 and 13 and the chambers 22, 23, 24, and 25 are preferably constructed as separate units as shown, it being then possible to assemble with the tubes 12 and 13 a unit of chambers 22, 23, 24, and 25 of requisite depth from front to rear, as shown, this latter unit being of the maximum depth which may be placed in the casing. Should a shallower unit or section be employed suitable filler members may be placed between it and the back wall of the casing.

The liquid to be used in the indicator may be an oil of low congealing point, preferably of some viscosity to prevent slopping about of the liquid line due to the motion of the vehicle. It may be dyed with a red or other conspicuous colored oil dye of light-fast properties, if desired. It is preferable to fill the indicator at the place of manufacture where it may be adjusted properly, and in order to prevent change of adjustment during shipment, the ports 18 and 19 may be closed by plugs which may be removed later through openings 34 and 35 through the back wall of the casing and the chambers 23 and 24, these openings being normally closed by stoppers 36 and 37 of any suitable description. The adjustment of the liquid in the back tubes may be effected by laying the instrument horizontally on its back before the plugs are removed from the ports 18 and 19 so that the equalization can take place through the ports 27 and 28 connecting the legs of these tubes, the leading out tubes 30 and 31 having their ends turned up toward the front as at 32 and 33 as above described so that the liquid may not run out during this operation.

It will be understood that the usefulness of this device is not confined to indicating the liquid level of fuel in the tank of a self-propelled vehicle, nor the changes of level of the order found there. By use of a large instead of a small number of tubes at either side of the reading tube it is possible to read pressures much higher than those for which the instrument shown is designed.

Having thus described an embodiment of this invention it is evident that many changes and modifications might be made therein without departing from its spirit or scope as defined by the appended claims.

I claim:

1. A device of the class described comprising a U tube having an indicator liquid column therein subjected through an elastic fluid to hydrostatic pressure from the level of the liquid to be measured, and a series of U tubes connected to opposite branches of said U-tube and having liquid columns therein and elastic fluid between said columns to balance a definite proportion of said pressure, said series being symmetrically arranged to compensate for external temperature changes.

2. An instrument for measuring liquid level comprising an indicator formed of an odd plural number of U-tubes each partially filled with a liquid and connected in series, means for subjecting the liquid in a U-tube at one end of said series to pressure from the lowest limit of level of the liquid the level of which is to be measured, and means for subjecting the liquid in the U-tube at the other end of said series to the pressure exerted on the surface of the liquid the level of which is to be measured, the middle tube of said series having a leg constructed with a calibrated portion adapted to cooperate with the liquid therein to indicate the levels to be measured.

3. An instrument for measuring liquid level comprising an indicator formed of an odd plural number of U-tubes each partially filled with a liquid and connected in series, means for subjecting the liquid in a U-tube at one end of said series to pressure from the lowest limit of level of the liquid the level of which is to be measured, and means for subjecting the liquid in the U-tube, at the other end of said series to the pressure exerted on the surface of the liquid the level of which is to be measured, the central U-tube of said series having a leg constructed to permit reading of the liquid level therein.

4. An instrument for indicating liquid levels comprising an indicator composed of a series of U tubes each partially filled with a liquid, and means for subjecting the liquid in a tube at one end of said series to pressure corresponding to the hydrostatic head due to the level to be measured, the central U-tube of said series having a leg constructed to permit reading of the liquid level therein, the tubes at each side of said intermediate tube being proportioned to balance substantially equal proportions of the pressure due to said head.

5. An instrument for indicating liquid levels in a tank which comprises an indicating U tube having a window shaped as the cross section of said tank and having an indicating liquid therein, U tubes connected in series with each end of said indicating tube and proportioned to balance equally by displacement of liquid columns therein pressure communicated thereto at one end of said series, and means for communicating pressure due to the static head of liquid in said tank to one end of said series, said parts being so proportioned as to maintain the level of indicating liquid relative to said window substantially the same as the level of liquid in said tank relative to said cross section.

6. A device of the class described comprising a casing, a window in the front wall of said casing, a pair of vertical partitions dividing the interior of said casing from front to back into three laterally extending chambers, said front partition having an opening therethrough near its base to form said two forward chambers as legs of a U tube, partitions extending from front to back in said rear chamber, certain of said partitions having openings therethrough and forming a pair of separate series of U tubes, said device having a port leading from one end of one of said series to the upper end of one of said forward chambers and a port leading from one end of the other series to the upper end of the other of said forward chambers, liquid columns in said chambers, and pressure connections for the other ends of said series.

7. A device of the class described comprising a casing, a window in the front wall of said casing, a pair of vertical partitions dividing the interior of said casing from front to back into three laterally extending chambers, said front partition having an opening therethrough near its base to form said two forward chambers as legs of a U tube, partitions extending from front to back in said rear chamber, certain of said partitions having openings therethrough to form a pair of separate series of U tubes, said device having a port leading from one end of one of said series to the upper end of one of said forward chambers and a port leading from one end of the other series to the upper end of the other of said forward chambers, liquid columns in said chambers, and pressure connections for the other ends of said series opening thereinto at points adjacent the upper end of the rearmost lateral partition.

8. A device of the class described comprising a casing, a window in the front wall of said casing, a pair of vertical partitions dividing the interior of said casing from front to back into three laterally extending chambers, said front partition having an opening therethrough near its base to form said two forward chambers as legs of a U tube, partitions extending from front to back in said rear chamber, certain of said partitions having openings therethrough to form a pair of separate series of U tubes, said device having a port leading from one end of one of said series to the upper end of one of said forward chambers and a port leading from one end of the other series to the upper end of the other of said forward chambers, the back wall of said casing having openings opposite said ports through which closing plugs may be inserted or removed therefrom, liquid columns in said chambers, pressure connections for the other ends of said series, and removable closures for said openings.

9. A liquid level indicator comprising a casing, a pair of lateral vertical partitions dividing said casing into a series of three chambers, the forward two being connected together at their lower ends to form a U tube, a window in the front wall of said casing showing the liquid level in one arm of said U tube, a pair of series of U tubes positioned in the rearmost of said chambers, one end of each series communicating with the opposite ends of the U tube formed by said two forward chambers and the other ends subjected respectively to pressure at the lowest level of liquid to be measured and the pressure exerted on the surface of said liquid, and liquid columns in all of said U tubes.

10. A device of the class described comprising a casing having a window in its front wall, elements in said casing forming therewith a pair of chambers connected to act as a U-tube, the level of liquid in one of said chambers being visible through said window, and a plurality of receptacles arranged in pairs as arms of other U tubes in said casing back of said chambers, one of said receptacles communicating at its upper end with the upper end of one of said chambers, and another of said receptacles of a different pair communicating at its upper end with the upper end of the other of said chambers.

11. A device of the class described comprising a casing, a window in the front wall of said casing, a pair of partitions extending laterally across said casing and forming a pair of chambers in communication at their lower ends, the level of liquid in one of said chambers being visible through one of said windows, a plurality of receptacles communicating in pairs with each other at their lower ends to form arms of U tubes in said casing back of said chambers, one of the receptacles of one pair communicating at its upper end with the upper portion of one of said chambers, and another receptacle of another pair communicating at its upper end with the upper end of said other chamber, and means for connecting the upper portion of the other receptacle of one of said pairs with a source of pressure.

In testimony whereof I have affixed my signature.

JOHN GURNEY CALLAN.